May 23, 1961
E. H. BOWERS ET AL
2,985,184
LIQUID FLOW CONTROL VALVE APPARATUS
Filed May 12, 1958
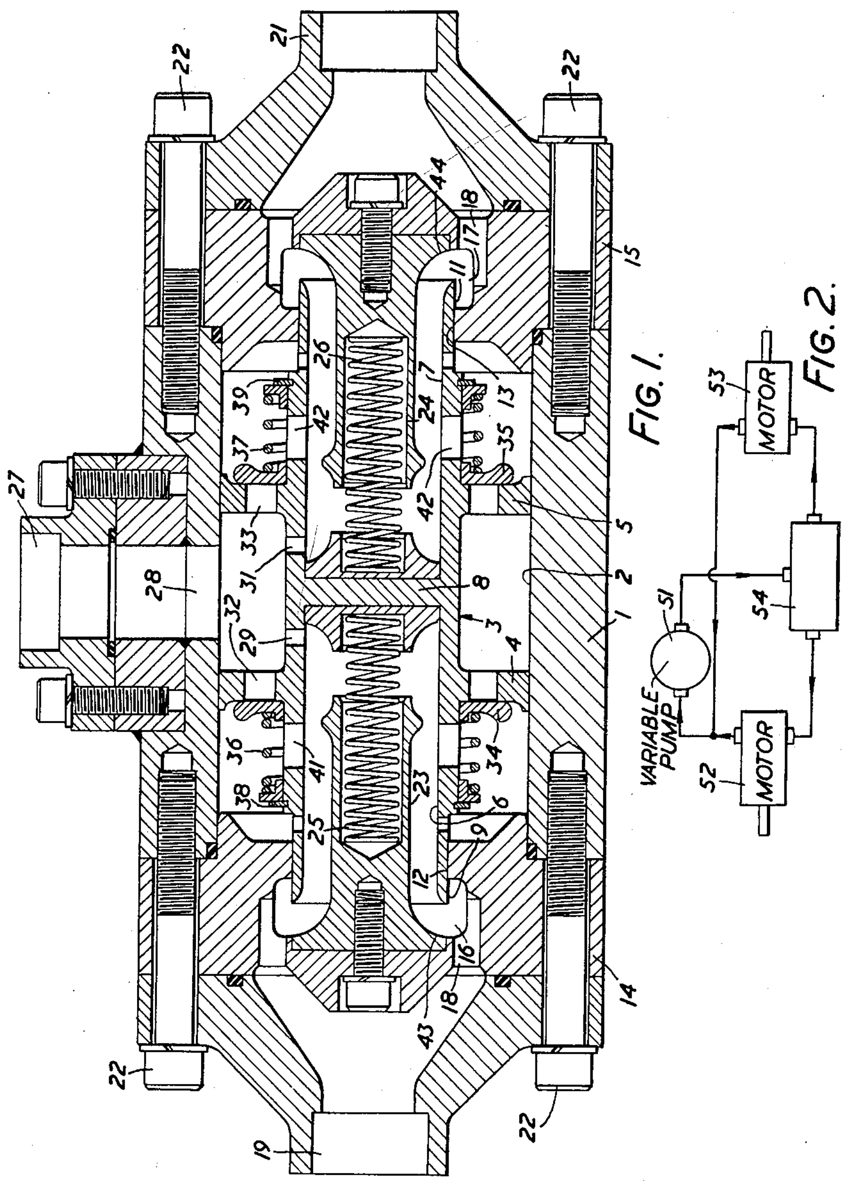
INVENTORS
ERIC H. BOWERS &
OSWALD THOMA
BY Reynolds Beach & Christensen
ATTORNEYS United States Patent Office 2,985,184

Patented May 23, 1961

2,985,184

LIQUID FLOW CONTROL VALVE APPARATUS

Eric H. Bowers, Cheltenham, England, and Oswald Thoma, Grunwald uber Munich, Germany, assignors to Dowty Hydraulic Units Limited, Tewkesbury, England Filed May 12, 1958, Ser. No. 734,598

Claims priority, application Great Britain May 10, 1957

8 Claims. (Cl. 137—101)

This invention relates to liquid flow control valve apparatus of known kind. This particular flow divider valve has as its particular function the division of a main liquid flow into two divided flows of approximately predetermined proportions by passing the smaller or divided flows through restrictions and using the pressure drops across the restrictions to adjust a valve which controls the relative proportions of the smaller flows. One disadvantage of such apparatus is that where the range of flow rates is very large then at lower flow rates the apparatus is insensitive whilst at higher flow rates the pressure drops involved are excessively large and reduce the overall efficiency of the system incorporating the apparatus.

The present invention has for its object to provide a valve apparatus of the kind referred to capable of operating over a large range of flows without being insensitive at lower flow rates or involving substantial losses at higher flow rates.

In accordance with the present invention in liquid flow control valve apparatus of the kind referred to, the restriction in each divided flow is arranged to be automatically variable in accordance with the flow such that at lower flow rates the restricting effect is greater to maintain sensitivity, but at higher flow rates the restricting effect is smaller to reduce the pressure drop. Preferably, the restriction in each flow comprises a fixed restriction in parallel with a restriction controlled by a spring-loaded valve.

One example of the invention will now be described with reference to the accompanying drawings, in which:

Figure 1 is a cross-section through the flow control apparatus; and

Figure 2 is a circuit diagram showing one method of use of the apparatus of Figure 1.

Referring now to Figure 1, the valve apparatus generally designated (Figure 2) by the numeral 54 is housed within a cylindrical body 1 having an internal bore 2 extending from end to end. Within this bore a slidable valve member 3 is located which is basically of cylindrical shape and includes a pair of flanges 4 and 5 projecting therefrom, the peripheries of these flanges engaging closely and slidably within the bore 2. The interior of the valve member 3 includes a pair of bores 6 and 7 extending from either end toward the centre, but the ends of the valve member are divided or separated one from the other, as by a partition 8 located at the centre to isolate the two bores from one another. The extreme ends 9 and 11 of the valve member 3 are of slightly reduced diameter to fit slidably within holes 12 and 13 formed within end caps 14 and 15 secured to the ends of the body 1. The bores 6 and 7 open respectively into annular spaces or chambers 16 and 17 formed within the end caps 14 and 15 and for each end cap passages such as a plurality of drilled holes 18 interconnect the annular space with pipe connectors respectively 19 and 21 secured over the respective end caps 14 and 15. Bolts 22 located at each end extend into the body 1 and secure both the pipe connector and the end cap in position at each end. The valve member 3 is automatically centralized between the chambers 16 and 17, by means such as opposed compression springs 25 and 26 received within the respective spring guides 23, 24 and extending into the bores 6 and 7. The inner ends of these springs press on the partition 8 in the valve member 3 to hold the valve member in a normally central position.

In the centre of the valve body 1 an inlet pipe connection 27 is located which connects to a main liquid flow passage or port 28 in the centre of bore 2. The port 28 is arranged to open between the flanges 4 and 5 which are spaced sufficiently far apart so that for extremes of movement of the valve member 3 in either direction the flanges do not occlude the port 28. In between the flanges 4 and 5 there are provided in the valve member 3 a pair of holes 29 and 31 which extend respectively into the bores 6 and 7. These holes form one pair of restricted flow passages from the inlet port 28 into the bores 6 and 7, adequate for passage of fluid at low flow rates. In each flange 4 and 5 there are provided passages such as a plurality of holes 32 and 33 respectively, whilst against these flanges on the opposite sides to the port 28 an annular valve plate respectively 34 and 35 is provided for each flange. These valve plates are held in position respectively by compression springs 36 and 37. The ends of the compression springs 36 and 37 are anchored by means of circlips 38 and 39 to the valve member 3. Each of these springs is preloaded in position. On the opposite sides of the flanges 4 and 5 to port 28 a series of holes respectively 41 and 42 are provided in the valve member 3, these holes extending respectively into the bores 6 and 7. The passages 32, 33 with their valves 34, 35 form a second pair of retricted flow pasages capable of supplementing the first pair at higher flow rates.

For operation, an inlet liquid flow to be divided, such as the delivery from a pump 51, is connected to the pipe connection 27 and passes thence by a pair of divided flow passages to motors 52, 53 respectively, emerging through connections 19 and 21. Where the flow rate into connection 27 is small, the flow enters the space between flanges 4 and 5 through port 28 and divides to flow only through the restrictions 29 and 31 into the bores 6 and 7. The divided flows pass through the two bores 6 and 7 into the annular spaces 16 and 17 and to the pipe connections 19 and 21. If one of the divided flows, say that passing through pipe connection 19, tends to increase because of some variation in the external circuit then it will be seen that the pressure drop in the divided flow as it passes through restriction 29 is greater than the pressure drop of the divided flow passing through restriction 31 with the result that the pressure on the right-hand side of valve member 3 is greater than that on the left-hand side whereby the valve member 3 moves to the left, the end 9 thereof approaching a seating 43 formed in the end cap 14 whilst the end 11 moves farther away from a seating 44 formed in the end cap 15. An extra restriction is thus added to the divided flow passing through bore 6 tending to maintain the divided flows equal. Because movement of the valve member will involve compression of the spring 25 a new position of equilibrium will be established at which there will be a small pressure difference between the divided flows, i.e. the pressure on the right-hand side of valve member 3 will be greater than that on the left-hand side and also the divided flow passing through the connector 19 will be slightly larger than that passing through connection 21. It will be appreciated that the operation of the valve member 3 is purely dependent on the relative values of the divided flows and that it may equally well operate in the opposite manner if the divided flow passing through connection 21 becomes larger than the divided flow passing through connection 19.

The above operation takes place for small flow rates, but where larger flow rates are supplied through pipe connection 27 the divided flows passing through restrictions 29 and 31 will produce a sufficient pressure drop that the annular valve members 34 and 35 will be moved from their seats on flanges 4 and 5 to allow liquid to flow respectively through the holes 32 and 41 to reach connection 19 and through holes 33 and 42 to reach connection 21. It will be seen that the greater the flow rate the more the valve members 34 and 35 will lift from their seats. Since unbalance of flows had initially shifted valve members 3 to the left, and the divided flows still must pass through the annular spaces 16 and 17, they are controlled by the co-operation of the ends 9 and 11 of the valve member respectively with the seats 43 and 44 and variation in the relative values of the divided flows will still cause the correcting action of the valve member 3 to tend to equalize the flows.

An example of the use of the valve apparatus described is in a simple hydraulic power transmission mechanism for driving a vehicle such as a tractor. Such an example is illustrated diagrammatically in Figure 2. In this figure a variable pump 51 is driven by the vehicle engine whilst a pair of substantially similar motors 52 and 53 are connected through suitable gearing to drive the two ground-engaging driving wheels of the tractor. The output from the pump 51 is connected to the valve apparatus 54 which is as described in Figure 1 and the two divided flows pass to the two motors 52 and 53, the return flows from these two motors then being connected together and fed back to the inlet of the pump 51. In this use the most important function of the valve apparatus 54 is to prevent spinning of one driving wheel in the event that it loses its driving grip on the ground. When such spinning occurs the hydraulic output of the pump 51 would tend to be confined entirely to the motor driving the spinning wheel and if this condition were to occur the action of the valve apparatus would be to throttle this flow almost entirely so that the effective output pressure of the pump is applied to the motor driving the other wheel. If this vehicle is driven along a curved path with both driving wheels being in non-sliding engagement with the ground it will be seen that the motors 52 and 53 will rotate at different speeds and differing flows will be required. To a certain extent the liquid supply to the motor driving the wheel on the outside of the curve will be restricted and cavitation might occur. To prevent this happening as far as possible the construction of the valve apparatus 54 is preferably such that the valve member 3 has a small clearance at its sliding surfaces thus to ensure that the flow dividing action is not highly accurate. It will be appreciated that the problems on a tractor of preventing wheel spin and, at the same time, of allowing different wheel speeds for travelling along a curved path require entirely different corrective actions. As proposed here, it has been assumed that it is most important to prevent wheel spin and allowance for differential rotational speed of the wheels has been considered the less important of the two problems.

We claim as our invention:

1. A flow divider valve mechanism capable of operation at widely varying flow rates, comprising a valve body having a bore and having an inlet flow passage for fluid under pressure, and outflow chambers communicating with the respective ends of its bore, a valve member slidably fitting within said bore, and cooperating at its ends with the entrances to the respective outflow chambers to throttle outflow to either one of such chambers relative to the other by its location endwise within its bore, and movable endwise to different locations by a pressure difference acting upon its opposite ends, said valve member being normally maintained in a centralized non-throttling position by equal pressures acting upon its opposite ends, a first and a second passage means for flow from said inlet flow passage past the valve member to each of the respective outflow chambers, the first of said passage means being arranged to be sensitive to a low flow rate in sensing a difference in pressure drop as between the two outflows, and by its location intermediate the inlet flow passage and the outflow chambers creating a pressure difference acting upon the opposite ends of the valve member to effect compensating shift of the valve member, for throttling the increased outflow, and the second of said passage means including valve means biased to close but arranged to be opened by an increased pressure difference resulting from a high flow rate, and in like manner effecting compensating shift of the valve member, to supplement throttling of the increased outflow as effected by the first passage means.

2. A flow divider valve mechanism as in claim 1, wherein each of the first passage means includes a fixed restriction, and each of the second passage means includes a further passage in parallel with the corresponding first-mentioned restriction, and said valve means comprises a valve member biased to close, governing said further passage and arranged to unseat, and so to allow flow through the further passage, when the pressure drop across the first restriction reaches a predetermined value.

3. A flow divider valve mechanism as in claim 2, wherein the valve body includes an enlarged bore in its central portion, with which the inlet flow passage communicates, a pair of flanges outstanding from the valve member and slidable within said enlarged bore, and spaced at opposite sides of the inlet flow passage and of the fixed restrictions, the flanges having apertures through them each constituting a portion of said second passage means, said valve means comprising a spring-loaded annular valve plate located on each flange, said valve plate when seated closing its aperture, but arranged to be opened by build-up of pressure intermediate the flanges at flow rates in excess of those which the corresponding fixed restriction can relieve.

4. A flow divider valve mechanism as in claim 1, including a freely open flow-restricting orifice in the first passage means, constituting the means to sense a difference in pressure drops as between the two outflows, at low flow rates.

5. A flow divider valve mechanism as in claim 4, wherein said valve means comprises a flow-restricting valve and seat included within the second passage means, yieldable means to retain the valve in closed position while pressure differences consonant only with low flow rate prevail, but yielding to open the valve under the influence of greater pressure differences attendant upon a flow rate above that which the first passage means can relieve, said flow-restricting valve and seat constituting the means to sense a difference in pressure drops as between the two outflows at higher flow rates.

6. A flow divider valve mechanism comprising a valve body having a longitudinal bore and having an inlet flow passage for fluid under pressure communicating with the central portion of said bore, a generally cylindrical valve member having a partition between its ends, two flanges outstanding from said valve member and slidably fitting in said bore, spaced apart to include the inlet flow passage between them, end caps fitting the respectively opposite ends of the bore, and each formed with an outflow chamber, and with a circular hole wherein the corresponding end of the cylindrical valve member slidably and fluid-tightly fits, in communication with the end chamber beyond such hole, each end of the valve member cooperating with the corresponding end cap to throttle outflow when the valve is shifted towards such end cap from a centralized position, compression springs disposed intermediate each end cap and said partition to centralize the valve member under conditions of substantially equal pressure at opposite ends of the valve member, but yieldable for endwise shifting of the valve member when subjected to unequal pressures at its opposite ends, a fixed restriction defining a passage means between the inlet flow passage and each outflow chamber, a valve port in each flange and a flow-restricting valve seating on each flange and cooperating with its valve port, spring means to retain each flow-restricting valve closed until pressure builds up within the inlet flow passage at a flow rate in excess of that which the fixed restriction can relieve, and then constituting a second passage means, the valve member having an additional port downstream of each flow-restricting valve, communicating with the corresponding outflow chamber past the end of the valve member, and also constituting part of said second passage means.

7. Flow divider valve means including a chambered valve body having an inlet flow connection intermediate its ends and outlet flow connections at its respectively opposite ends, a valve member slidable endwise within said valve body, a seat member carried by each end of the valve body and cooperating with the corresponding ends of the valve member to effect variable restriction of outflow at the opposite ends of the valve body as the valve member shifts endwise, means to maintain the valve member normally centralized for outflow at given ratio from the respective ends, first passage means freely open but including a flow restrictor opening, and arranged to afford restricted constant communication between the inlet flow connection and the upstream side of each seat member, second passage means also arranged to afford further communication between the inlet flow connection and the upstream side of each seat member, spring-loaded valve means biased to close and located in each second passage means, to block normal flow through the latter, but openable by build-up of back pressure upstream of the respective seat members at flow rates in excess of that which the first passage means with its flow restrictors can relieve, and means carried by the valve member and subject to such back pressure to shift the valve member axially in the sense to restrict outflow at the seat member where the pressure drop is less in ratio to that at the opposite seat member, and thereby to maintain the given ratio of outflow.

8. Flow divider valve means including a cylindrical valve body having an inlet flow connection intermediate its ends and outlet flow connections at its respectively opposite ends, a sleeve-like valve member axially slidably received in said valve body, two flanges outstanding from said valve member and spaced at opposite sides of said inlet flow connection, a centralized partition isolating the opposite ends of said valve member and defining two opposite end chambers, a seat member carried by each end of the valve body and cooperating with the corresponding end of the valve member to effect variable restriction of outflow from the adjoining end chamber to the corresponding outlet flow connection as the valve member shifts axially, yieldable means to maintain the valve member normally centralized, first passage means including a flow restrictor orifice affording constant but restricted communication between the space between the flanges of the valve member and each end chamber, second passage means affording, when fully open, unrestricted communication by-passing said first passage means between the same space and the respective end chambers, and spring-loaded valve means biased to close, controlling said second passage means but openable by build-up of pressure in said space at flow rates in excess of that which the first passage means can relieve.

References Cited in the file of this patent

UNITED STATES PATENTS

| | | |
|---|---|---|
| 2,128,853 | Roen | Aug. 30, 1938 |
| 2,365,095 | Miller et al. | Dec. 12, 1944 |
| 2,534,871 | Lichtman | Dec. 19, 1950 |
| 2,844,159 | Trethewey | July 22, 1958 |